United States Patent
Yoon et al.

(10) Patent No.: US 10,362,443 B2
(45) Date of Patent: Jul. 23, 2019

(54) SYSTEM AND METHOD FOR AUTOMATICALLY DETECTING EXIT AND ENTRY FOR INTEREST REGION

(71) Applicant: DOOSAN HEAVY INDUSTRIES & CONSTRUCTION CO., LTD., Changwon-si, Gyeongsangnam-do (KR)

(72) Inventors: Seock Moon Yoon, Daejeon (KR); Seong Yeol Yang, Yongin-si (KR); Seung Take Oh, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/082,937

(22) PCT Filed: Jul. 6, 2016

(86) PCT No.: PCT/KR2016/007325
§ 371 (c)(1),
(2) Date: Sep. 7, 2018

(87) PCT Pub. No.: WO2017/191867
PCT Pub. Date: Nov. 9, 2017

(65) Prior Publication Data
US 2019/0082291 A1    Mar. 14, 2019

(30) Foreign Application Priority Data
May 4, 2016  (KR) .......................... 10-2016-0055343

(51) Int. Cl.
*H04W 4/021* (2018.01)
*G01S 1/68* (2006.01)
(Continued)

(52) U.S. Cl.
CPC ............... *H04W 4/021* (2013.01); *G01S 1/68* (2013.01); *G01S 11/06* (2013.01); *G06Q 10/08* (2013.01);
(Continued)

(58) Field of Classification Search
CPC ....... H04W 4/021; H04W 4/80; H04W 88/02; H04B 17/318; G01S 1/68; G01S 11/06; G07C 9/00; G06Q 10/08; G06Q 50/10
See application file for complete search history.

(56) References Cited

U.S. PATENT DOCUMENTS

2014/0009292 A1*  1/2014  Long ........................ H04Q 9/00
                                              340/573.1
2015/0206096 A1*  7/2015  Fernandez ........... G06Q 10/087
                                              705/28

FOREIGN PATENT DOCUMENTS

JP    2005107792 A    4/2005
JP    2013086912 A    5/2013
(Continued)

OTHER PUBLICATIONS

Korean Office Action issued by the Korean Intellectual Property Office dated Nov. 23, 2016 in connection with Korean Patent Application No. 10-2016-0055343.
(Continued)

*Primary Examiner* — Dinh Nguyen
(74) *Attorney, Agent, or Firm* — Invenstone Patent, LLC (57) ABSTRACT

A system for detecting exit and entry for an interest region for automatically detecting entry and exit for an object in an interest region that is disclosed includes a wireless position sensor attached to an object to set an identification number and for transmitting a beacon having the identification number at a certain period, a wireless terminal for receiving the beacon from the wireless position sensor, extracting the identification number included in the beacon, and detecting
(Continued)

entry and exit for the object using the extracted number of times of the identification number during a predetermined certain time and a Received Signal Strength Indicator (RSSI) of the beacon, a server system for receiving entry and exit detection information for the object from the wireless terminal.

12 Claims, 3 Drawing Sheets

(51) Int. Cl.

| | | |
|---|---|---|
| *G01S 11/06* | (2006.01) | |
| *G06Q 10/08* | (2012.01) | |
| *G06Q 50/10* | (2012.01) | |
| *H04W 88/02* | (2009.01) | |
| *H04B 17/318* | (2015.01) | |
| *H04W 4/80* | (2018.01) | |
| *G07C 9/00* | (2006.01) | |

(52) U.S. Cl.
CPC .............. *G06Q 50/10* (2013.01); *G07C 9/00* (2013.01); *H04B 17/318* (2015.01); *H04W 4/80* (2018.02); *H04W 88/02* (2013.01)

(56) References Cited

FOREIGN PATENT DOCUMENTS

| KR | 20070009214 A | 1/2007 |
|---|---|---|
| KR | 20080023515 A | 3/2008 |
| KR | 20110003687 A | 1/2011 |
| KR | 101299582 B1 | 8/2013 |
| KR | 20150139072 A | 12/2015 |

OTHER PUBLICATIONS

An International Search Report dated Nov. 9, 2017 in connection with International patent application No. PCT/KR2016/007325.

* cited by examiner

SYSTEM AND METHOD FOR AUTOMATICALLY DETECTING EXIT AND ENTRY FOR INTEREST REGION

CROSS-REFERENCE TO RELATED APPLICATIONS

This application is a national stage of International Application No. PCT/KR2016/007325, filed 06 Jul. 2016, which claims the benefit of priority to Korean Application(s) No. 10-2016-0055343, filed 04 May 2016 in the Korean Intellectual Property Office, the disclosures of which are incorporated herein by reference.

TECHNICAL FIELD

The present disclosure relates to a system and a method for automatically detecting exit and entry for an interest region, and more particularly, to a system and a method for automatically detecting exit and entry for an interest region using the number of times of identification numbers extracted from a beacon and the RSSI of the received beacon at a certain time.

BACKGROUND ART

Generally, large plants, such as power generation or chemistry, need a large number of materials in a company producing and operating them. These materials are kept in a material warehouse and frequently arrived/shipped, such that it is not easy to manage and monitor them by workforce.

Conventionally, it was indicated that materials arrived or shipped using a work log or a terminal for managing the materials. As described above, it was too inefficient for a person to describe the arrival or shipment thereof, and the likelihood of human error or deliberate omission was substantial.

Accordingly, it became necessary to automatically monitor the arrival/shipment of materials. As the related art, Korean Patent Laid-Open Publication No. 10-2009-0001970 proposes a resource management system using a RFID card tag and this describes only how to manage the resource after being detected rather than automatically detecting the arrival/shipment to the material warehouse.

DISCLOSURE

Technical Problem

An object of the present disclosure for solving the above problems is to provide a system and a method for automatically detecting materials that exit from and enter into an interest region in order to enable automatic management of the materials.

Technical Solution

A system for detecting exit and entry for an interest region for automatically detecting entry and exit for an object in an interest region in accordance with the present disclosure for achieving the object can include a wireless position sensor attached to an object to set an identification number, and for transmitting a beacon having the identification number at a certain period; a wireless terminal for receiving the beacon from the wireless position sensor, extracting the identification number included in the beacon, and detecting entry and exit for the object using the extracted number of times of the identification number and a Received Signal Strength Indicator (RSSI) of the beacon during a predetermined certain time; and a server system for receiving entry and exit detection information for the object from the wireless terminal to store and manage it.

In addition, the system for detecting exit and entry for the interest region can further include a gateway connected with the wireless terminal in a wireless communication scheme and connected with the server system in a wired communication scheme to mediate data communication between the wireless terminal and the server system. In addition, the system for detecting exit and entry for the interest region can further include at least one of a control PC and a mobile device, and the server system can transmit the entry and exit detection information for the object to at least one of the control PC and the mobile device.

Herein, the wireless terminal can detect the identification number as the entry when the extracted number of times of the identification number during the predetermined certain time is equal to or greater than three, an average of the received RSSI of the beacon is equal to or greater than −70 dBm, the received RSSI of the most recently received beacon is equal to or greater than −70 dBm, and the identification number is not present in a wireless position sensor management table; can detect the identification number as the exit when the identification number is present in the wireless position sensor management table but is not extracted once during the predetermined certain time; can also detect the identification number as the exit when any one of three conditions, in which the extracted number of times of the identification number during the predetermined certain time is equal to or greater than three, an average of the received RSSI of the beacon is equal to or greater than −70 dBm, and the received RSSI of the most recently received beacon is equal to or greater than −70 dBm, is not satisfied; and can also detect the identification number as the exit when the case, in which any one of three conditions in which the extracted number of times of the identification number during the predetermined certain time is equal to or greater than three, an average of the received RSSI of the beacon is equal to or greater than −70 dBm, and the received RSSI of the most recently received beacon is equal to or greater than −70 dBm is not satisfied, continuously occurs repeatedly by a certain number of times or more.

Meanwhile, a method of detecting exit and entry for an interest region for automatically detecting entry and exit for an object in an interest region in accordance with the present disclosure for achieving the object can include (a) transmitting a beacon having an identification number at a certain period in a wireless position sensor attached to an object; (b) extracting the identification number included in the beacon and calculating a Received Signal Strength Indicator (RSSI) of the beacon by receiving the beacon from the wireless position sensor; and (c) detecting entry and exit for the object using the extracted number of times of the identification number during a predetermined certain time and the RSSI of the beacon.

Herein, the (c) can further include at least one of determining the identification number as the entry when the extracted number of times of the identification number is equal to or greater than three during a predetermined certain time, an average of the RSSI is equal to or greater than −70 dBm, the most recently received RSSI is equal to or greater than −70 dBm, and the identification number is not present in a wireless position sensor management table; or determining the identification number, which is present in a wireless position sensor management table but is not extracted once during the predetermined certain time, as the exit; determining the identification number as the exit when any one of three conditions, in which the extracted number of times of the identification number during the predetermined certain time is equal to or greater than three, an average of the RSSI is equal to or greater than −70 dBm, and the most recently received RSSI is equal to or greater than −70 dBm, is not satisfied; and detecting the identification number as the exit when the case, in which any one of three conditions in which the extracted number of times of the identification number during the predetermined certain time is equal to or greater than three, an average of the received RSSI of the beacon is equal to or greater than −70 dBm, and the received RSSI of the most recently received beacon is equal to or greater than −70 dBm is not satisfied, continuously occurs repeatedly by a certain number of times or more.

Advantageous Effects

According to the present disclosure, it is possible to eliminate the inefficiency caused by the manual operation and to minimize the human error in the arrival/shipment management in the material storage zone.

In addition, the state of the material is confirmed in real time, such that it is possible to minimize the human resource input for material inspection, thus reducing the costs.

BEST MODE

Hereinafter, embodiments of the present disclosure will be described in detail with reference to the accompanying drawings so that those skilled in the art to which the present disclosure pertains can easily practice the embodiments of the present disclosure. The present disclosure can be embodied in many various forms and is not limited the embodiments described herein.

Descriptions of irrelevant components are omitted so as to clearly describe the present disclosure, and throughout this specification, the same or like elements are denoted by the same reference numerals.

Throughout this specification, when an element is referred to as being "connected" to another element, it can be "directly connected" to the other element or "electrically connected" to the other element with other elements interposed therebetween. In addition, when an element is referred to as "comprises" another element, the element is intended not to exclude one or more other elements, but to further include one or more other elements, unless the context clearly indicates otherwise.

When it is described that any one part is "on" the other part, the part can be directly on the other part or any other part can be interposed therebetween. On the contrary, when it is described that any one part is "directly on" the other part, there is no other part interposed therebetween.

The terms "first," "second," "third" and the like are used to illustrate different parts, components, areas, layers and/or sections, but are not limited thereto. These terms are only used to differentiate a certain part, component, area, layer or section from other part, component, area, layer or section. Accordingly, a first part, component, area, layer or section, which will be mentioned hereinafter, can be referred to as a second part, component, area, layer or section without departing from the scope of the present disclosure.

The terminology used herein is for the purpose of describing particular embodiments only and is not intended to limit the present disclosure. As used herein, the singular forms are intended to include the plural forms as well, unless the context clearly indicates otherwise. The terms "comprises" when used in this specification, specify the presence of stated features, regions, integers, steps, operations, elements, and/or components, but do not preclude the presence or addition of one or more other features, regions, integers, steps, operations, elements, and/or components.

Terms "below", "above", and the like indicating a relative space can be used to more easily describe a relationship between one part illustrated in the drawings with another part. These terms are intended to include other meanings or operations of a device that is being used, in addition to meanings intended in the drawings. For example, when the device in the drawing is inverted, any parts described as being "below" other parts can be described as being "above" the other parts. Accordingly, the exemplary term "below" includes both of an upper direction and a lower direction. The device can rotate by 90° or other angles, and the terms indicating a relative space are also interpreted according thereto.

Unless otherwise defined, all terms (including technical and scientific terms) used herein have the same meaning as commonly understood by one of ordinary skill in the art to which this disclosure belongs. The terms, such as those defined in commonly used dictionaries, should be additionally interpreted as having a meaning that is consistent with their meaning in the context of the relevant art and/or the present disclosure, and will not be interpreted in an idealized or overly formal sense unless expressly so defined herein.

Hereinafter, exemplary embodiments of the present disclosure will be described in detail with reference to the accompanying drawings so that those skilled in the art can easily practice the present disclosure. However, the present disclosure can be implemented in various different forms, and is not limited to the exemplary embodiments described herein.

The following describes that a wireless position sensor 200 and wireless terminals 100a, 100b communicate with each other using a Bluetooth Low Energy (BLE) beacon, but in the present disclosure, all of wireless communication schemes that can transmit a unique identification number other than the BLE beacon can be available.

In addition, the following describes the arrival/shipment of materials in the material warehouse or the storage yard as an embodiment, but it will be apparent that the present disclosure can be also applied to all objects other than the materials.

Figure 1:
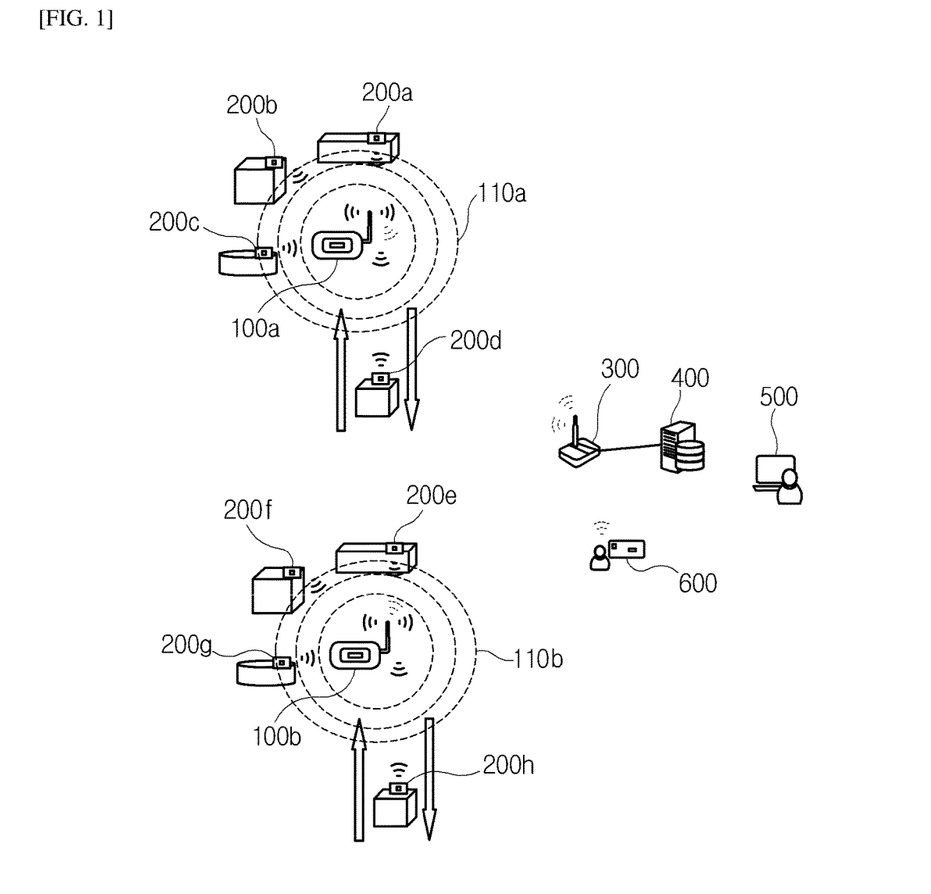
FIG. 1 is a diagram schematically illustrating a system for automatically detecting exit and entry for interest regions 110a, 110b in accordance with an embodiment of the present disclosure.

FIG. 1 is a diagram schematically illustrating a system for automatically detecting exit and entry for interest regions 110a, 110b in accordance with an embodiment of the present disclosure.

Referring to FIG. 1, a system for automatically detecting exit and entry for interest regions 110a, 110b in accordance with the present disclosure can include wireless position sensors 200a to 200h attached to a material to move with the material, wireless terminals 100a, 100b for collecting a wireless signal from the wireless position sensor, a gateway 300 connected to the wireless terminals 100a, 100b in a wireless communication scheme and for collecting data from the wireless terminals 100a, 100b to deliver it to a server system 400, and the server system 400 for processing the data from the wireless terminals and storing material management information. In addition, the system for automatically detecting exit and entry for interest regions 110a, 110b can further include a control PC 500 and a mobile device 600.

In the example of FIG. 1, two interest regions 110a, 110b are set as an embodiment. Herein, the interest region can be a material warehouse or an outdoor storage yard. In addition, two or more interest regions can be set. The wireless terminal 100a can monitor exit and entry for the interest region 110a, and the wireless terminal 100b can monitor exit and entry for the interest region 110b. Then, the gateway 300 enables data communication with the two wireless terminals 100a, 100b in a wireless communication scheme. Then, the wireless terminals 100a, 100b can support two wireless communication schemes. One wireless communication scheme is for wireless communication with the wireless position sensors 200a to 200h and the other wireless communication scheme is for wireless communication with the gateway 300. In this embodiment, one wireless terminal is illustrated for each interest region, but two or more wireless terminals can be also provided in the interest region. That is, in a large warehouse or storage yard, two or more wireless terminals can be provided to form one interest region, and two or more wireless terminals can monitor the arrival/shipment of the interest region.

The wireless position sensors 200a to 200h can be attached to each of the materials that is arrived in/shipped from the interest regions 110a, 110b to move with the material. The wireless position sensors 200a to 200h can transmit a Bluetooth Low Energy (BLE) beacon and in this time, transmit the beacon including a unique identification number. At the timing when the wireless position sensors 200a to 200h are attached to the material, the logistics information related to the material can be stored in the database of the server system 400. Then, the server system 400 can interlock the unique identification numbers of the wireless position sensors 200a to 200h with the logistics information related to the material. That is, the server system 400 can acquire the material-related logistics information with the wireless position sensors 200a to 200h attached from the database based on the unique identification numbers of the wireless position sensors 200a to 200h.

The wireless terminals 100a, 100b can receive the BLE beacons from the neighboring wireless position sensors 200a to 200h, and extract the identification numbers of the wireless position sensors 200a to 200h included in the BLE beacon. The antennas of the wireless terminals 100a, 100b can be precisely controlled to receive only BLE beacon signal from the wireless position sensors 200a to 200h that are present in the interest regions 110a, 110b for which they are responsible. Herein, the interest regions 110a, 110b can be material warehouses for storing the material, or storage yards for storing the material. The wireless terminals 100a, 100b can detect the exit and entry for the interest regions 110a, 110b of the material using the number of times of the identification numbers extracted within a certain time and a Received Signal Strength Indicator (RSSI).

Figure 2:
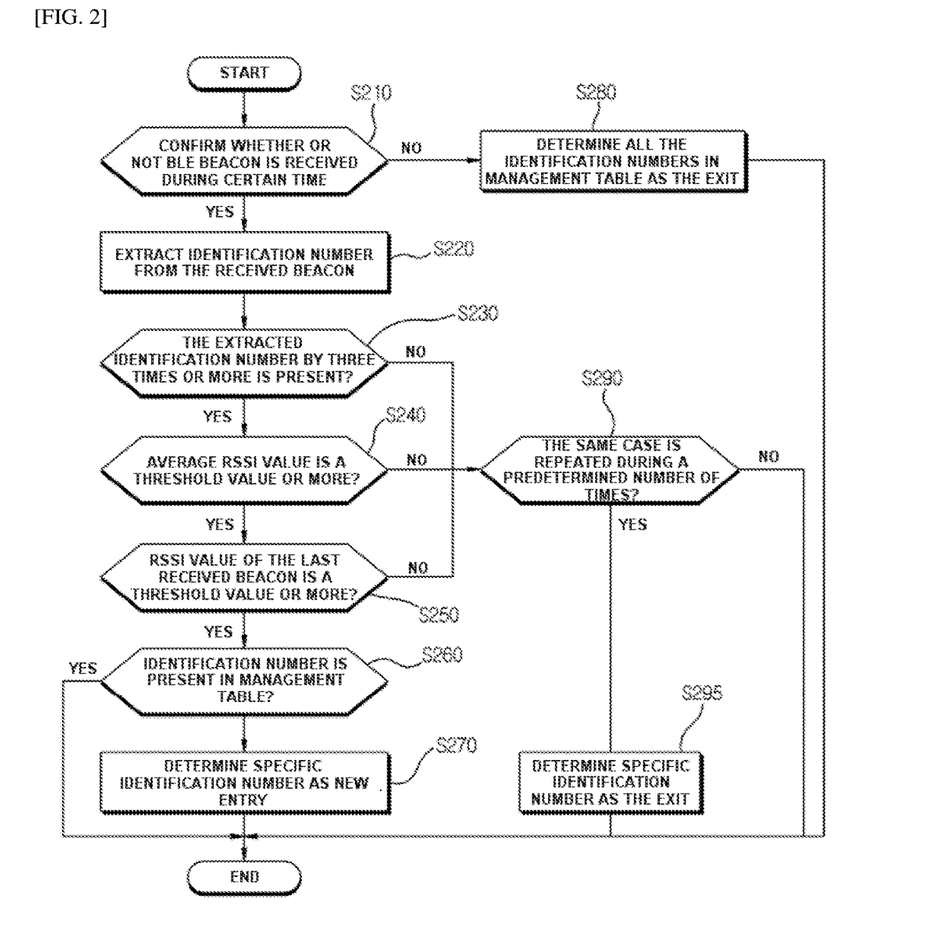
FIG. 2 is a diagram illustrating a method of detecting exit and entry for a material in the interest regions 110a, 110b by wireless terminals 100a, 100b in accordance with the embodiment of the present disclosure.

FIG. 2 is a diagram illustrating a method of detecting exit and entry for interest regions 110a, 110b of material by wireless terminals 100a, 100b in accordance with the embodiment of the present disclosure.

Referring to FIG. 2, in explaining a method of detecting new entry, the wireless terminals 100a, 100b determine whether or not a BLE beacon is received during a certain time S210. When the BLE beacon has been received, the wireless terminals 100a, 100b extract the identification numbers of the wireless position sensors 200a to 200h from each beacon S220, confirm whether or not the extracted identification number by a predetermined number of times or more is present by checking the extracted number for each identification number (condition a) S230. Then, the wireless terminals 100a, 100b confirm whether or not an average of the received RSSI of the beacon having the identification number for the identification number extracted by a predetermined number of times or more is equal to or greater than a predetermined threshold value (condition b) S240. When the average of the received RSSI is equal to or greater than the predetermined threshold value, the wireless terminals 100a, 100b can determine that the wireless position sensors 200a to 200h corresponding to the adjacent locations are present, and proceed to the next step. In the next step, the wireless terminals 100a, 100b confirm whether or not the RSSI of the last received beacon is equal to or greater than the predetermined threshold value (condition c) S250. Even if the average of the received RSSI is equal to or greater than the predetermined threshold value, when the last received RSSI is equal to or less than the predetermined threshold value, it can be seen that the wireless position sensors 200a to 200h are farther from the wireless terminals 100a, 100b than previous locations, such that only the possibility of the exit therefrom is present. Thereafter, the wireless terminals 100a, 100b confirm whether or not the identification number satisfying all of the three conditions a, b, and c is present in the wireless position sensor management table S260. When it is present, the wireless terminals 100a, 100b can be regarded as adjacent sensor already entered, such that a special operation is not performed, and when it is not present, the wireless terminals 100a, 100b can add the identification number satisfying all of the three conditions a, b, and c in the wireless position sensor management table and determine that the material attaching the wireless position sensors 200a to 200h having this identification number has newly entered into the interest regions 110a, 110b S270. When the new entry is detected, the wireless terminals 100a, 100b can notify that the entry has been detected by transmitting the identification number in which the entry is detected to the server system 400 through the gateway 300.

As an embodiment of the present disclosure, the wireless position sensors 200a to 200h can be set to transmit beacons three times (one every 400 ms) for 1.2 seconds. A transmission period in this time can be determined depending upon how fast the wireless position sensor needs to be recognized and how much the average battery consumption is made. Then, the wireless terminals 100a, 100b should confirm whether or not the BLE beacon is received during a certain time, and the certain time should be longer than the transmission period of the wireless position sensors 200a to 200h and be also the time sufficient to clarify the entry and exit for the wireless position sensor. For example, the certain time can be 1.5 seconds. The wireless position sensors 200a to 200h transmit it three times for 1.2 seconds, such that when receiving the BLE beacon three or more times for 1.5 seconds, it can be expected that the wireless position sensors 200a to 200h are adjacent thereto. Accordingly, the predetermined number of times can be three. The predetermined number of times can be changed depending upon the set value of the certain time and the beacon transmission period of the wireless position sensors 200a to 200h. Then, even if the identification number has been extracted by the predetermined number of times or more, when the average RSSI is equal to or less than a predetermined threshold value, the wireless position sensors 200a to 200h cannot be considered to be adjacent to the wireless terminals 100a, 100b. The threshold value in this time can be changed depending on how size the range that the wireless terminals 100a, 100b can recognize to be adjacent thereto is limited and how much the transmission power of the wireless position sensors 200a to 200h sets, and for example, the threshold value can be set to −70 dBm.

Referring to FIG. 2, in explaining a method of detecting the exit therefrom, the wireless terminals 100a, 100b can determine that the exit has occurred not only in the cases where the BLE beacon is not received, but also any one of the three conditions a, b, and c used to detect the above entry is not satisfied.

The wireless terminals 100a, 100b check whether the BLE beacon is received or not during a certain time (S210). When the wireless terminals 100a, 100b cannot receive any BLE beacon, the wireless terminals 100a, 100b can determine that no wireless position sensors 200a to 200h are adjacent thereto, and in this case, the wireless terminals 100a, 100b can determine all the identification numbers that are present in the wireless position sensor management table as the exit and delete them (S280). However, there can be also the case where the BLE beacon is temporarily not received due to the influence of the wireless environment. Accordingly, in order to prevent erroneous deletion, in the case that the identification numbers of the wireless position sensors 200a to 200h are included in the wireless position sensor management table, when the wireless terminals 100a, 100b has not received the BLE beacon continuously during the predetermined time or the detected number of times, all the identification numbers that are present in the wireless position sensor management table can be finally deleted. The wireless terminals 100a, 100b can notify the server system 400 of the identification number detected as the exit by transmitting the deleted identification numbers in the wireless position sensor management table to the server system 400.

As a result of confirming that the beacon has been received and extracting the identification number from the received beacon S220, when any one of three conditions, in which a specific identification number is extracted by the predetermined number of times or more (condition a), an average RSSI of the beacon having the specific identification number is equal to or greater than a predetermined threshold value (condition b), and the RSSI of the last received beacon for the specific identification number is equal to or greater than the predetermined threshold value (condition c), is not satisfied, the wireless terminals 100a, 100b can detect it as the exit because the wireless position sensor having the identification number is not adjacent thereto. However, even if all the conditions a, b, and c are not satisfied, the wireless position sensors 200a to 200h can be located adjacent to the wireless terminals 100a, 100b. This is because all the conditions a, b, and c cannot be temporarily satisfied due to the influence of the wireless environment. Then, in this case, there is a possibility that the next detection satisfies all the conditions a, b, and c. Accordingly, when it is determined as the exit immediately because any one of the conditions a, b, and c is not satisfied, there is a possibility that the exit and the new entry are continuously repeated, such that by determining whether or not the case that any one of the conditions a, b, and c is not satisfied during the predetermined time or the detected number of times occurs, it is possible to determine whether or not the same case occurs during the predetermined time or the detected number of times S290, and the wireless terminals 100a, 100b can also determine as the exit of the wireless position sensor only when the same case occurs during the predetermined time or the detected number of times S295.

Then, there can be a case where the identification number is present in the management table but the identification number cannot be extracted from the received beacon. In this case, the identification number can be determined as the exit immediately. In this embodiment, the wireless position sensors 200a to 200h can transmit beacons at least three times for 1.5 seconds when the wireless terminals 100a, 100b receive the beacon, and the wireless terminals 100a, 100b can confirm that nothing is adjacent thereto when receiving nothing during three times to thereby determine it as the exit immediately, in this case.

Table 1 is a table illustrating an embodiment of the wireless position sensor management table of the wireless terminals 100a, 100b in accordance with the present disclosure.

TABLE 1

| Identification number | Checking number of times |
|---|---|
| All | 3 |
| 000195186BDF | 3 |
| 000195186C04 | 2 |
| 000195186D13 | 2 |

As an embodiment of the above-described exit detection, the wireless position sensor management table that is present in the wireless terminals 100a, 100b can be composed of the BLE identification number and the checking number of times of each identification number. Herein, the region of the BLE identification number can indicate the identification numbers of the wireless position sensors 200a to 200h that are within the interest regions 110a, 110b adjacent to the wireless terminals 100a, 100b, and the checking number of times can indicate the number of times that should check for each identification number until it is determined as the exit. That is, in this embodiment, in the case that a predetermined checking number of times is three and the identification number is 000195186BDF, when the three conditions a, b, and c described above are not satisfied in three consecutive times, it can be determined at the exit; and in the case that the identification number is 000195186C04, when the three conditions a, b, and c described above are not satisfied in a previous checking and then the three conditions a, b, and c described above are not satisfied even in the next two checking, it can be determined as the exit from the interest regions 110a, 110b.

Then, the identification number, "All" in the wireless position sensor management table in Table 1 indicates that no beacon is received during a reception period of 1.5 seconds. When one is received, the checking number of times for "All" is changed to three that is the predetermined checking number of times; when nothing is received, the checking number of times is reduced by 1; and when the checking number of times becomes 0, all the identification numbers that are determined to be adjacent thereto in the wireless position sensor management table can be deleted and detected as the exit.

In addition, in the extracting the identification number from the above-described received beacon S220, only two identification numbers, 000195186BDF and 000195186C04, among the three identification numbers indicated as entered in Table 1 are extracted therefrom, and when the remaining one, 000195186D13, is not extracted, the wireless terminals 100a, 100b can determine as the exit the identification number, 000195186D13, indicated to be adjacent thereto in the management table. This is because that when the wireless terminals 100a, 100b has not extracted the identification number for 1.5 seconds even if the wireless position sensor transmits a beacon every 400 ms as in the above example, they have not received the beacon during at least three times and as a result, it is determined that nothing is adjacent thereto and as the exit immediately.

When detecting the exit from the interest regions 110a, 110b, the wireless terminals 100a, 100b can notify that the exit has been detected by deleting the identification number, which is detected as the exit, from the management table and transmitting it to the server system 400 through the gateway 300.

Through the above-described method, the wireless terminals 100a, 100b can determine the entry and/or the exit for the interest regions 110a, 110b of the wireless position sensors 200a to 200h, and deliver the thus determined result to the server system 400 through the gateway 300.

Referring back to FIG. 1, the gateway 300 includes wireless communication and wired communication modules to perform data communication with the wireless terminals 100a, 100b using the wireless communication module, and to perform data communication with the server system 400 using the wired communication module. Accordingly, the gateway 300 can mediate data exchange between the wireless terminals 100a, 100b and the server system 400.

In this time, a LoRa communication protocol can be used for data communication between the wireless terminals 100a, 100b and the gateway 300. The LoRa communication is a low-power telecommunication protocol proposed by the LoRa Alliance. When using LoRa communication, there is an advantage in that one gateway 300 can cover a plurality of wireless terminals 100a, 100b that detect entry and exit for a plurality of interest regions 110a, 110b in a wide region to minimize a network infra. In addition, WiFi or ZigBee communication protocol can be used. Wi-Fi is a wireless LAN protocol that transmits data based on the IEEE 802.11 standard, and ZigBee is one of the IEEE 802.15.4 standards supporting near field communication and is a protocol that can support wireless networking in home, an office, etc.

In addition, the gateway 300 can additionally have a WiFi communication module for communication with the mobile device 600 of a supervisor. The WiFi communication module can be used when the server system 400 wants to transmit entry and/or exit information for the interest regions 110a, 110b to the mobile device 600 of the supervisor. The gateway 300 can receive data from the server system 400 using wired communication and transmit it to the mobile device 600 of the supervisor using the Wi-Fi communication module. In this time, when the wireless communication module for data communication with the wireless terminals 100a, 100b is the Wi-Fi communication module, the same Wi-Fi communication module can be used for communication with the wireless terminals 100a, 100b and the mobile device 600 of the supervisor.

The server system 400 can perform arrival/shipment management in the interest regions 110a, 110b based on the entry and/or exit information for the identification number received from the wireless terminals 100a, 100b through the gateway 300. As an embodiment, when the interest regions 110a, 110b are material warehouses, the server system 400 can store the material-related information acquired at the time of attaching the wireless position sensors 200a to 200h to the material and the identification number of the wireless position sensor in the database. Then, when the server system 400 receives the entry of the identification number from the wireless terminals 100a, 100b having a material warehouse as the interest regions 110a, 110b, it can store it in the database to be associated with the identification number, the material-related information, and current location. When receiving the exit information, the server system 400 can delete current location information of the database. When exiting and then entering into another material warehouse or another storage yard, the server system 400 can compensate the location information in real time by changing the current location information. Through the above-described operation, the server system 400 can store the material-related information stored in a specific material warehouse or storage yard, and rapidly perform stocktaking in real time if necessary.

The server system 400 can transmit information related to arrival/shipment of material to the control PC 500 or the mobile device 600 in real time.

Figure 3:
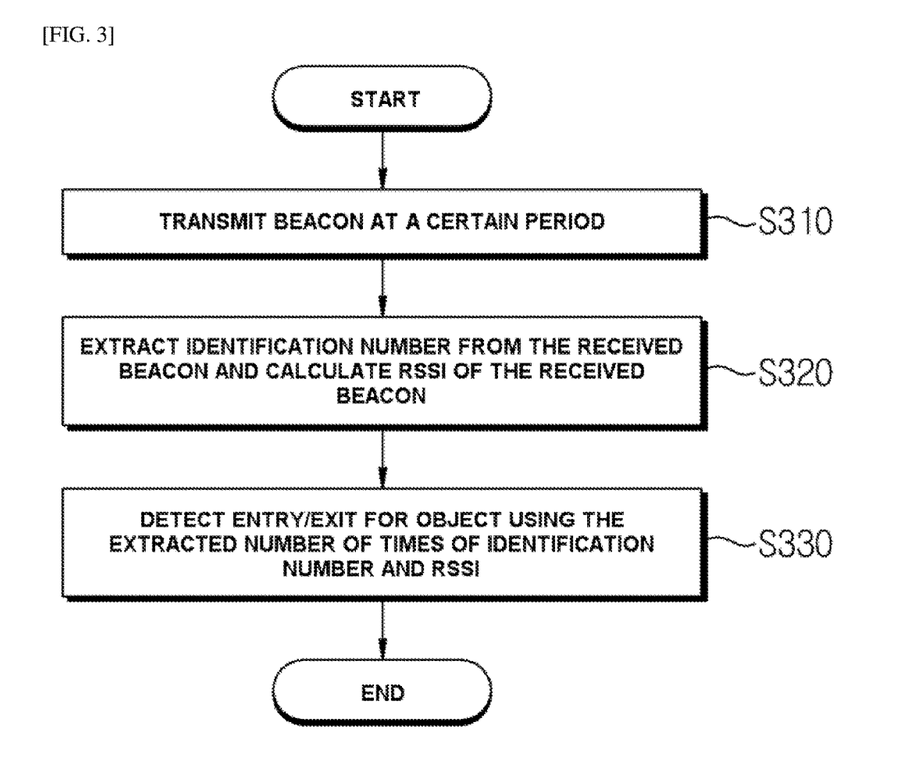
FIG. 3 is a flowchart illustrating a method of detecting entry and exit for a material in the interest regions 110a, 110b in accordance with the embodiment of the present disclosure.

FIG. 3 is a flowchart illustrating a method of detecting entry and exit for a material for the interest regions 110a, 110b in accordance with the embodiment of the present disclosure.

Referring to FIG. 3, in order to detect the entry and exit for a material for the interest regions 110a, 110b, the wireless position sensors 200a to 200h can transmit beacons at a certain period S310. Then, the wireless terminals 100a, 100b receive beacons transmitted from the wireless position sensors 200a to 200h during a certain time. In this time, a certain period during which the wireless position sensors 200a to 200h transmit beacons can be smaller than ⅓ of the certain time during which the wireless terminals receive the beacons. As an embodiment, the wireless position sensors 200a to 200h can transmit beacons three times for 1.2 seconds, i.e., its period can be 400 ms, and the wireless terminal can receive all the beacons that are incoming for 1.5 seconds.

The wireless terminals 100a, 100b can extract the identification number from the beacon received for a certain time and simultaneously calculate the RSSI of the received beacon S320. When the RSSI of the beacon is too small or the identification number cannot be extracted for other reasons, the wireless terminals 100a, 100b can discard the calculated RSSI together.

Thereafter, the wireless terminals 100a, 100b can automatically detect the entry and/or the exit for the material using the extracted number of times of the identification number and the calculated RSSI during a certain time S330. A method of automatically determining entry and exit for a material can refer to the function of the above-described wireless terminal.

As described above, according to the present disclosure, it is possible to automatically detect the entry and/or the exit for a specific interest region in real time and to store it in the server system, thus not only eliminating inefficiency due to manual operation, but also minimizing human errors in the arrival/shipment management within the interest region (the material storage zone such as a material warehouse or a storage yard), and to automatically perform material inspection within the interest region in the server system in real time without human resource input, thus reducing costs.

Those skilled in the art to which the present disclosure pertains should be understood that the present disclosure may be implemented in other various forms without departing from the technical spirit or essential characteristics of the present disclosure, so the aforementioned embodiments should not be construed as being limitative, but should be construed as being only illustrative from all aspects. The scope of the present disclosure is disclosed in the appended claims rather than the detailed description, and it should be understood that all modifications or variations derived from the meanings and scope of the present disclosure and equivalents thereof are included in the scope of the appended claims.

The invention claimed is:

1. A system for automatically detecting entry and exit of an object for a region of interest, the system comprising:
    a wireless position sensor fixed to the object, the wireless position sensor configured to set an identification number and to transmit a beacon including the identification number at a certain period;
    a wireless terminal for receiving the transmitted beacon, extracting the identification number included in the beacon, detecting entry and exit of the object using a received signal strength indicator (RSSI) of the beacon and a number of times that the identification number is extracted during a predetermined time, and transmitting entry and exit detection information of the object; and
    a server for receiving and storing the transmitted entry and exit detection information of the object,
    wherein the wireless terminal detects the entry of the object when
        the number of times that the identification number is extracted during the predetermined time is at least a predetermined number of times,
        an average of the RSSI of received beacons exceeds a predetermined threshold,
        the RSSI of the most recently received beacon exceeds the predetermined threshold, and
        the identification number is not present in a wireless position sensor management table.

2. The system as claimed in claim 1, further comprising a gateway connected with the wireless terminal in a wireless communication scheme and connected with the server in a wired terminal communication scheme to mediate data communication between the wireless and the server.

3. The system as claimed in claim 1, further comprising at least one of a control desktop computer and a mobile device,
    wherein the server transmits the stored entry and exit detection information of the object to at least one of the at least one of the control desktop computer and the mobile device.

4. The system as claimed in claim 1, wherein the predetermined number of times is three and the predetermined threshold is −70 dBm.

5. The system as claimed in claim 1, wherein the wireless terminal detects the exit of the object when the identification number is present in the wireless position sensor management table but is not extracted once during the predetermined time.

6. The system as claimed in claim 1, wherein the wireless terminal detects the exit of the object when any one of three conditions is not satisfied, the three conditions consisting of
    the number of times that the identification number is extracted during the predetermined time being at least three,
    an average of the RSSI of received beacons exceeding −70 dBm, and
    the RSSI of the most recently received beacon exceeding −70 dBm.

7. The system as claimed in claim 1, wherein the wireless terminal detects the exit of the object when any one of three conditions occurs at least a predetermined number of times in succession, the three conditions consisting of
    the number of times that the identification number is extracted during the predetermined time being at least three,
    an average of the RSSI of received beacons exceeding −70 dBm, and
    the RSSI of the most recently received beacon not exceeding −70 dBm.

8. A method of automatically detecting entry and exit of an object for a region of interest, the object being fixed with a wireless position sensor configured to set an identification number, the method comprising:
    (a) transmitting a beacon having the identification number at a certain period;
    (b) extracting the identification number included in the beacon and calculating a received signal strength indicator (RSSI) of the beacon, by receiving the transmitted beacon; and
    (c) detecting entry and exit of the object, using the RSSI of the beacon and a number of times that the identification number is extracted during a predetermined time,
    wherein the detecting (c) comprises determining the entry of the object when
        the number of times that the identification number is extracted during the predetermined time is at least a predetermined number of times,
        an average of the RSSI of received beacons exceeds a predetermined threshold,
        the RSSI of the most recently received beacon exceeds the predetermined threshold, and
        the identification number is not present in a wireless position sensor management table.

9. The method of claim 8, wherein the predetermined number of times is three and the predetermined threshold is −70 dBm.

10. The method of claim 8, wherein the detecting (c) comprises:
    determining the exit of the object when the identification number is present in the wireless position sensor management table but is not extracted once during the predetermined time.

11. The method of claim 8, wherein the detecting (c) comprises:
    determining the exit of the object when any one of three conditions is not satisfied, the three conditions consisting of
        the number of times that the identification number is extracted during the predetermined time being at least three,
        an average of the RSSI of received beacons exceeding −70 dBm, and
        the RSSI of the most recently received beacon exceeding −70 dBm.

12. The method of claim 8, wherein the detecting (c) comprises:
- detecting the exit of the object when any one of three conditions occurs at least a predetermined number of times in succession, the three conditions consisting of
- the number of times that the identification number is extracted during the predetermined time being at least three,
- an average of the RSSI of received beacons exceeding −70 dBm, and
- the RSSI of the most recently received beacon not exceeding −70 dBm.

* * * * *